(No Model.) 7 Sheets—Sheet 1.

F. LUNDGREN.
MACHINE FOR MAKING BOXES.

No. 434,545. Patented Aug. 19, 1890.

Witnesses:
J. D. Caplinger
Edward Dey

Inventor,
Frans Lundgren,
By Henry Connett
his Attorney

THE NORRIS PETERS CO., PHOTO-LITHO., WASHINGTON, D. C.

(No Model.) 7 Sheets—Sheet 2.
F. LUNDGREN.
MACHINE FOR MAKING BOXES.

No. 434,545. Patented Aug. 19, 1890.

Witnesses:
Inventor:

(No Model.) 7 Sheets—Sheet 5.

F. LUNDGREN.
MACHINE FOR MAKING BOXES.

No. 434,545. Patented Aug. 19, 1890.

Witnesses: Inventor.

(No Model.) 7 Sheets—Sheet 6.

F. LUNDGREN.
MACHINE FOR MAKING BOXES.

No. 434,545. Patented Aug. 19, 1890.

Witnesses:
John A. Rennie.
J. H. Caplinger

Inventor
Frans Lundgren
By Henry Connett
Attorney.

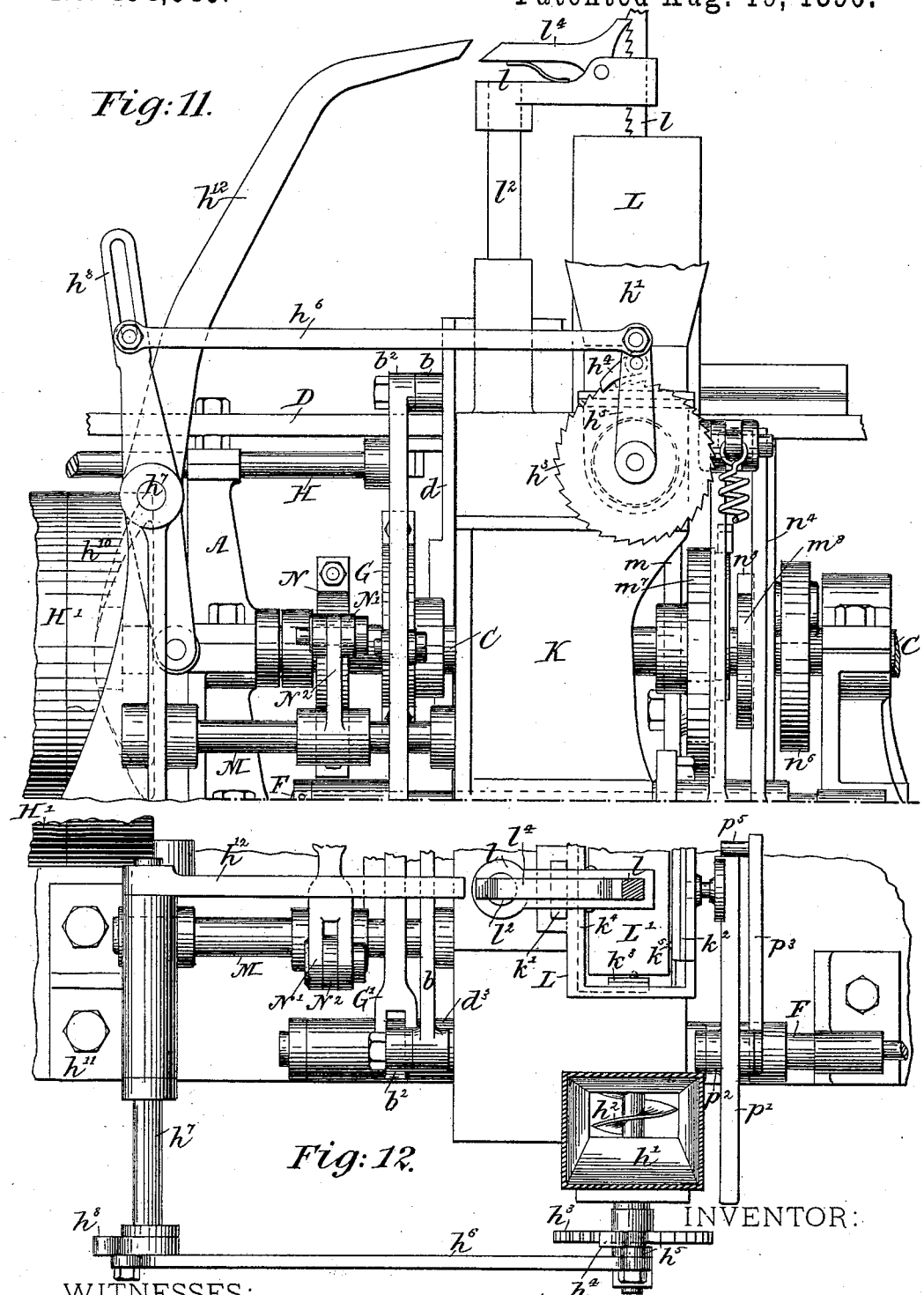

UNITED STATES PATENT OFFICE.

FRANS LUNDGREN, OF STOCKHOLM, SWEDEN.

MACHINE FOR MAKING BOXES.

SPECIFICATION forming part of Letters Patent No. 434,545, dated August 19, 1890.

Application filed December 18, 1888. Serial No. 293,959. (No model.) Patented in Sweden August 30, 1888, No. 1,857; in England September 6, 1888, No. 12,908; in Norway October 2, 1888, No. 1,154; in Belgium October 6, 1888, No. 83,496; in Germany October 9, 1888, No. 48,678, and in Austria-Hungary January 2, 1889, No. 61,228 and No. 40,687.

*To all whom it may concern:*

Be it known that I, FRANS LUNDGREN, a subject of the King of Sweden, and a resident of Stockholm, Sweden, have invented certain Improvements in Machines for Making Boxes, (for which a patent has been granted in Great Britain, No. 12,908, dated September 6, 1888; in Sweden, No. 1,857, dated August 30, 1888; in Belgium, No. 83,496, dated October 6, 1888; in Germany, No. 48,678, dated October 9, 1888; in Norway, No. 1,154, dated October 2, 1888, and in Austria-Hungary, No. 61,228 and No. 40,687, dated January 2, 1889,) of which the following is a specification.

This invention relates to that class of machines which are employed in constructing boxes or parts of boxes from thin sheet material, as pasteboard, veneer, &c., by creasing and folding blanks cut from the same.

The herein-described machine is employed in the manufacture of match-boxes or boxes for like uses of a well-known kind made from thin wood veneer and comprising a slide in the form of a tray that fits and slides in a rectangular tubular casing commonly called the "tube."

The machine embodying my invention constructs only the tubes, forming them from primarily-creased veneer-blanks and covers for the veneer made from paper and pasted thereon. These paper covers, which are primarily printed and cut to the proper dimensions, I call "labels," as the printed matter therein forms the label for the box.

Figure 1:
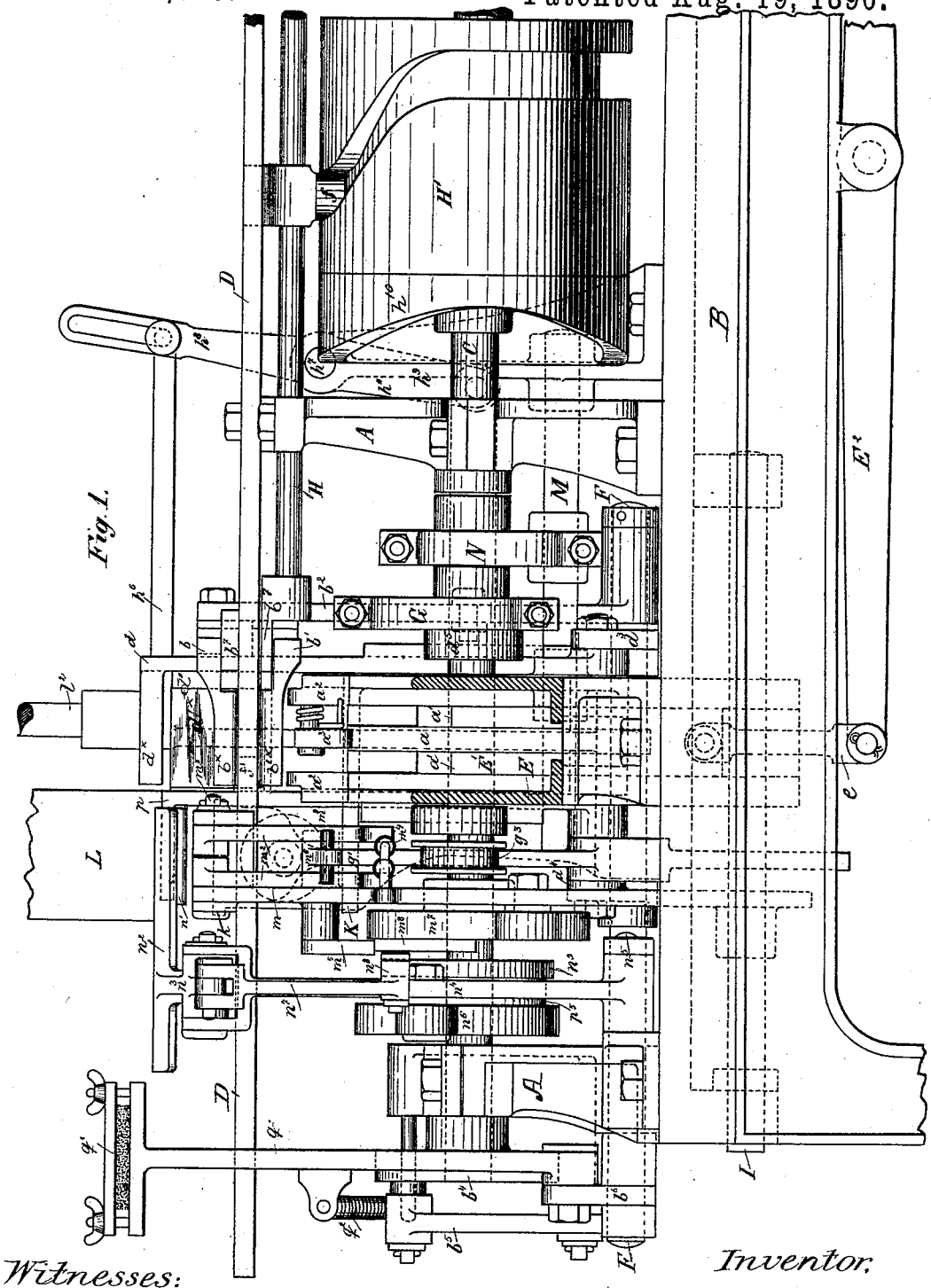
Figure 2:
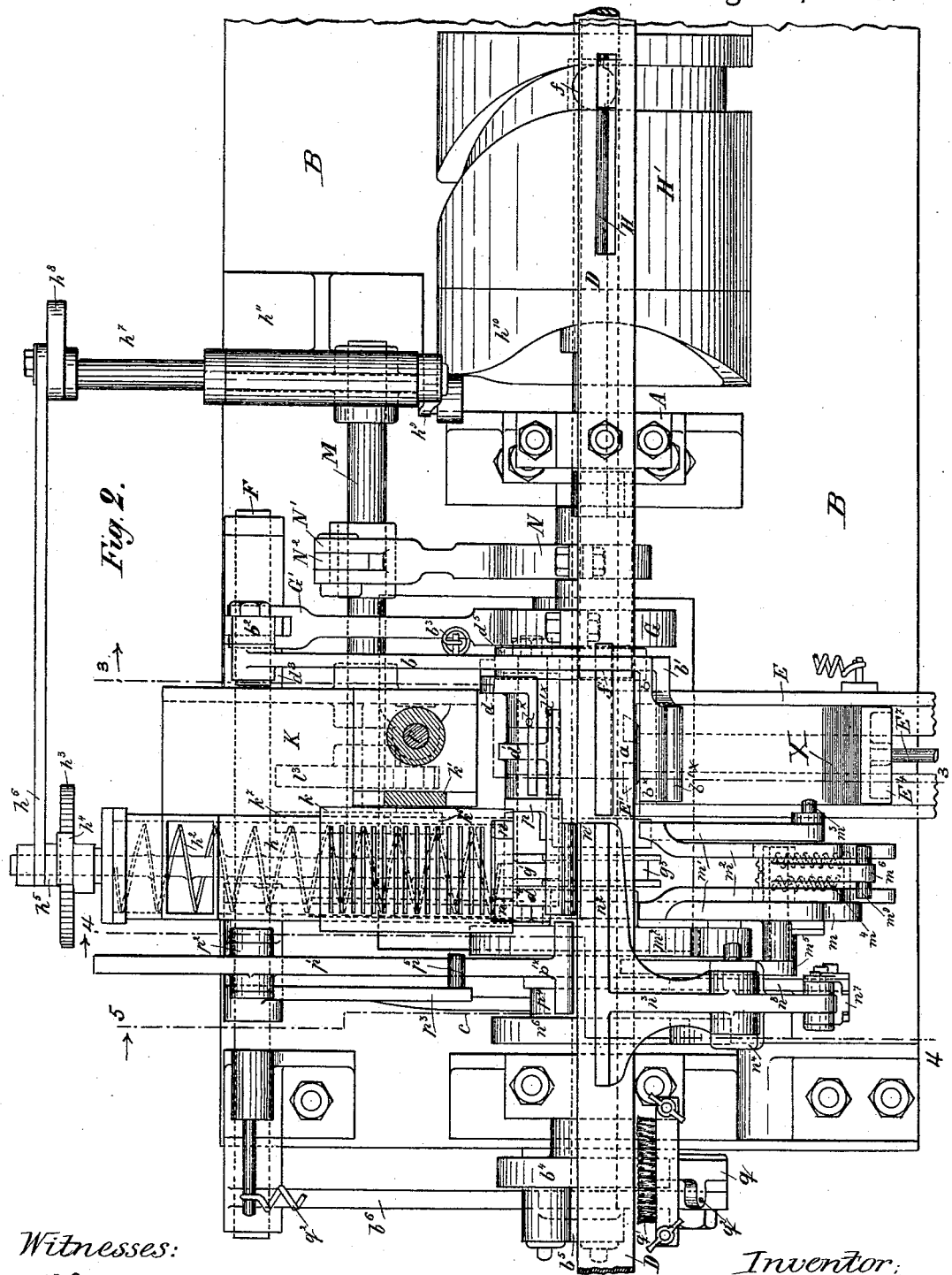
Figure 3:
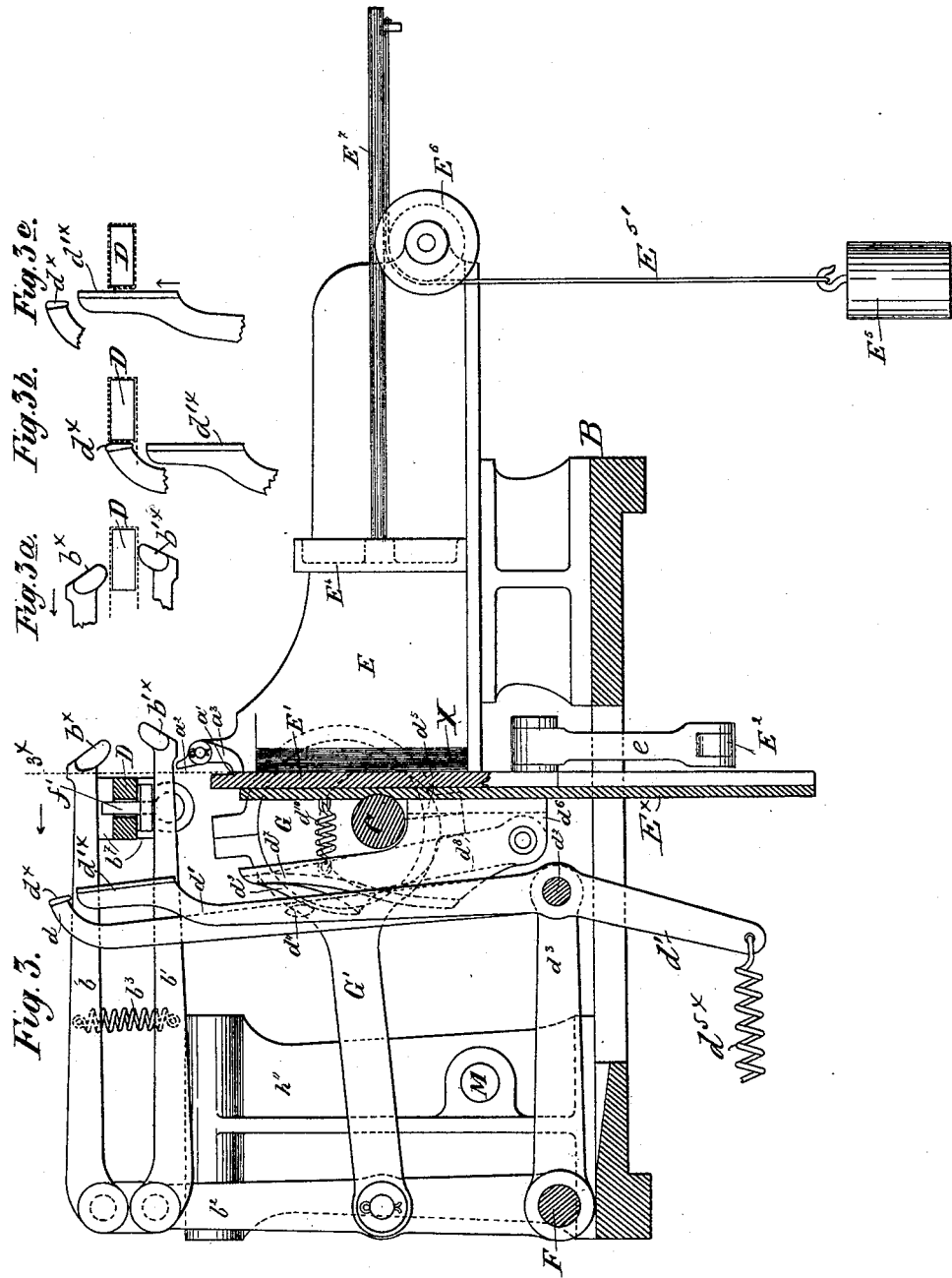
Figure 4:
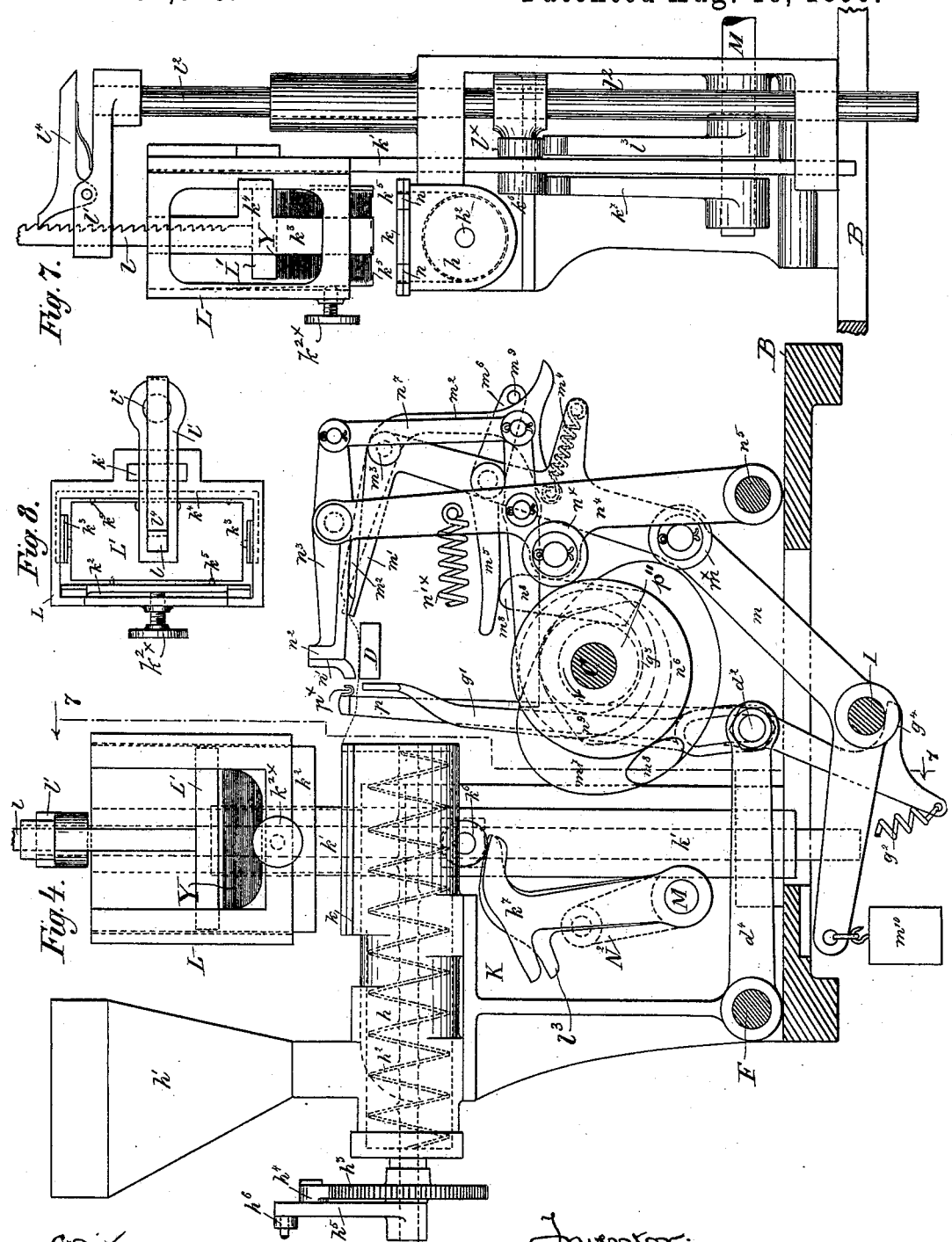
Figure 5:
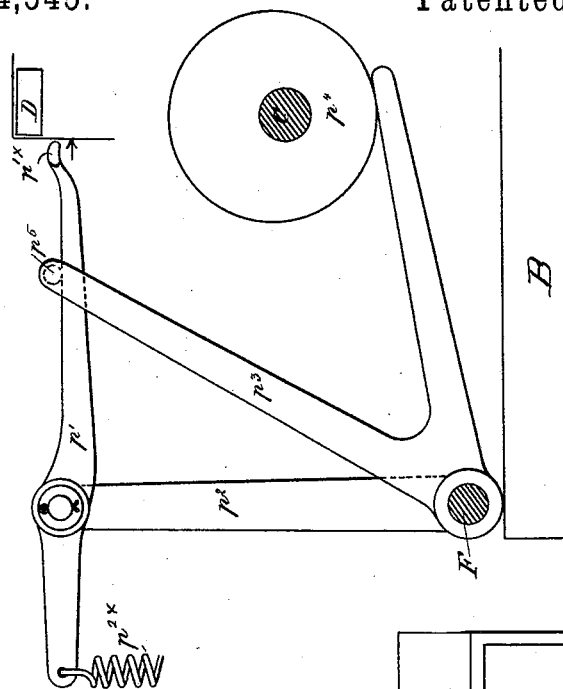
Figure 6:
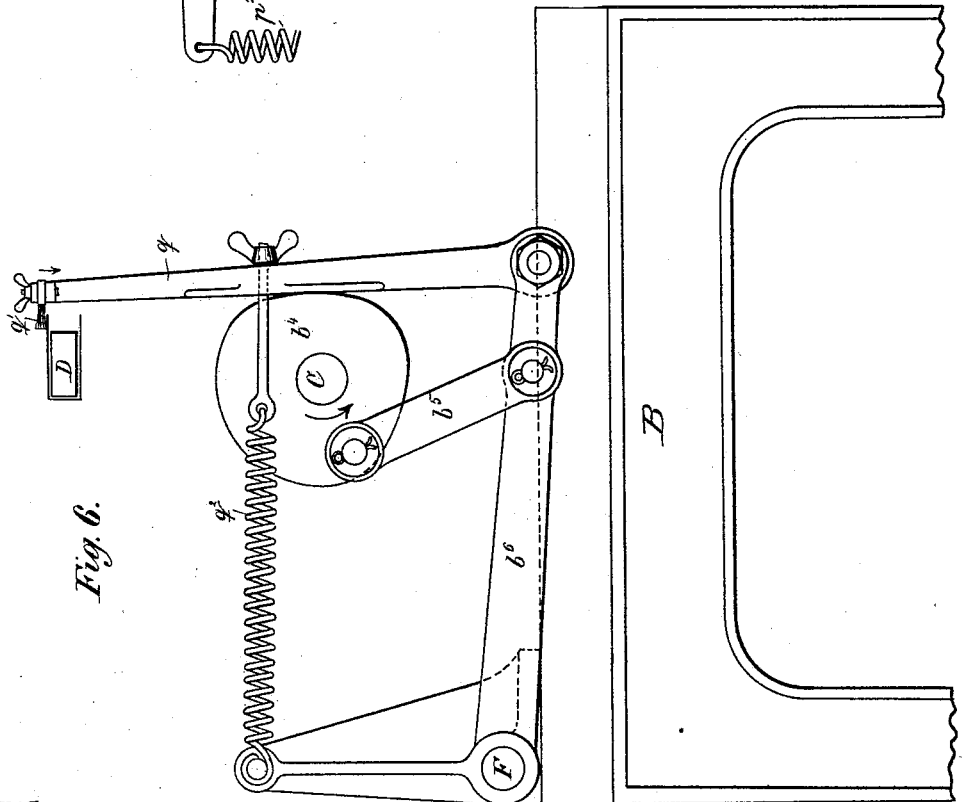
Figure 9:
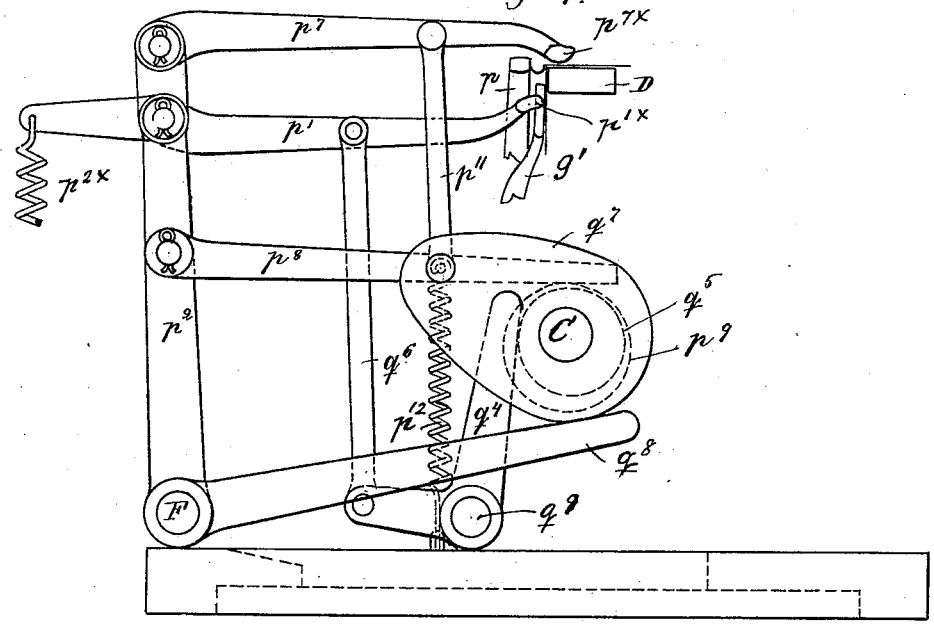
Figure 10:
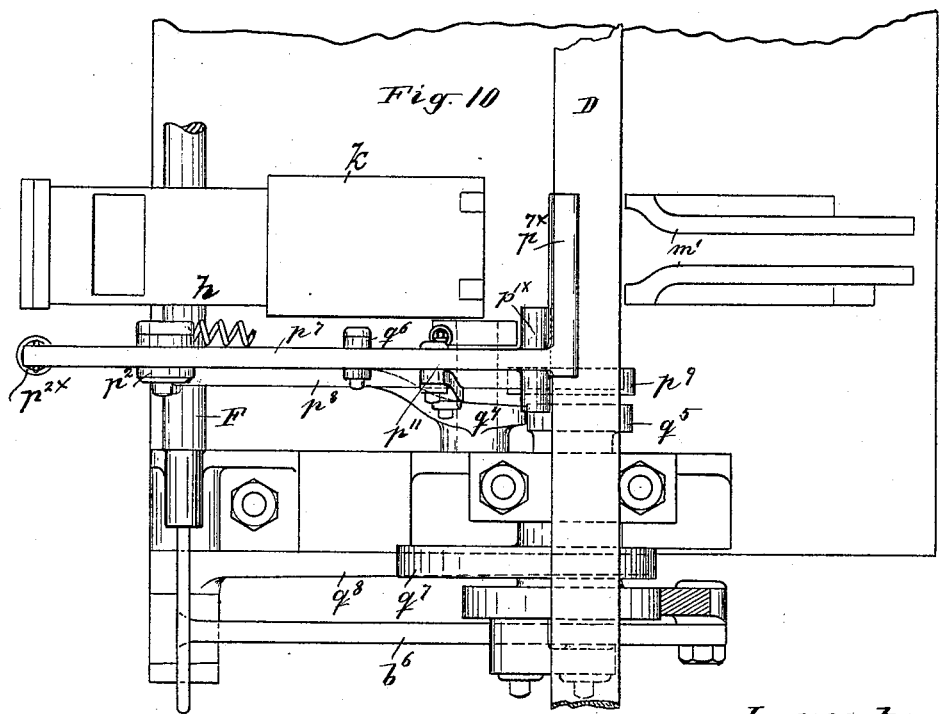

In the accompanying drawings, which serve to illustrate my invention, Figure 1 is a side view of the machine, and Fig. 2 is a plan of the same with the label-holder omitted. Figs. 3, 4, and 5 are respectively transverse sections taken on the lines 3 3, 4 4, and 5 5 in Fig. 2. Figs. $3^a$, $3^b$, and $3^c$ are fragmentary views illustrating the operation of the veneer-blank folders, seen best in Fig. 3. Fig. 6 is an end view of the machine as seen from the left hand in Fig. 2. Fig. 7 is a transverse section on line 7 7 in Fig. 4. Fig. 8 is a plan view of the label-holder L and its appurtenances, seen in elevation in Figs. 4 and 7. In the several sectional views only such parts of the mechanism are represented as co-operate at one time in the construction of the tubes. Figs. 9 and 10 are respectively an elevation and plan illustrating a modification of the label-applying device. Fig. 11 is a side elevation of a part of the machine, and Fig. 12 is a plan of the same part. These views illustrate a device that will be described hereinafter.

I will now describe the construction and operation of the machine.

The main driving-shaft C of the machine is mounted in suitable bearings or pillow-blocks A A on the main frame or bed B of the machine. On this shaft C are secured the various cams and eccentrics employed in the machine. The veneer is primarily cut into rectangular blanks of the proper dimensions, and these blanks are suitably creased across the grain along the lines where the folds are to be made. The blanks (X in Figs. 2 and 3) are placed in a trough E. From this trough they are fed one by one to the folding devices.

Above the main shaft C and parallel therewith is arranged a bar D, which is the "former" about which the veneer-blank is folded to form a rectangular tube. This bar D is of uniform size throughout, and its cross-section corresponds exactly with that of the inside of the tube to be formed thereon. This former or bar is fixed at one end only—that end at the right in Figs. 1 and 2—the other end standing free and clear. By reference to Fig. 3 it will be seen that the inner or delivery end of the blank-trough E extends up nearly to the vertical plane in which stands the front edge of the bar D.

The blanks X (see Fig. 3) are placed in front of a follower $E^4$, which plays in the trough E, and are kept pressed up toward the delivery end of the trough by a weight $E^5$, attached to a cord or strap $E^{5\prime}$, which passes over a grooved pulley $E^6$ and is attached to the stem $E^7$ of the follower $E^4$. The stem of the follower, as well as the cord, is guided in the groove in the pulley, as well illustrated in Fig. 3. I have only represented a few of the blanks in the trough E in Figs. 2 and 3, as these will illustrate how they are placed without obscuring the mechanical features. The delivery end of the trough E is closed by an upright plate $E^x$, up to which the blanks X are pressed, and the face of this plate is grooved to receive a vertically-reciprocating pusher $E'$. In order to prevent the middle portions of the blanks from bulging out too far into the path of the pusher when the latter is drawn down, I construct the pusher with two branches or forks and leave a central rib $a$, Figs. 1 and 2, on the plate $E^x$, which stands nearly flush with the face of the pusher, so that the blanks have bearing-points between the branches of the pusher, as well as at both sides thereof. Near its upper end the pusher has a rabbet cut in it which forms a shoulder $a'$, Figs. 1 and 3, the depth of the rabbet being about equal to the thickness of a blank X. When the pusher $E'$ is drawn down until this shoulder is below the bottom of the trough E, the follower $E^4$ will press the blanks up to said pusher, and when the pusher rises again this shoulder $a'$ will take under the end blank and raise it. In Figs. 1 and 3, $a^2 a^2$ represent fixed guides for the blank above the trough E, and $a^3$ in Figs. 1 and 3 represents a spring-actuated finger that just touches the face of the blank that is being lifted and prevents said blank from carrying up by surface friction another blank or blanks with it. In Fig. 3 the dotted line $3^x$ represents the blank that has been pushed up by the pusher $E'$. The pusher is actuated by a lever $E^2$, one end of which is coupled to the pusher by a link $e$. The other end of the lever $E^2$ is depressed by an eccentric or cam on the main shaft C, (not shown for lack of room.) The pusher lifts the blank up in front of the bar D until the middle of the blank stands opposite the bar, as represented by the dotted line $3^x$ in Fig. 3, when the folders act on the blank and fold it about the bar D, the ends of the blank overlapping each other at that side.

I will now describe the folding devices or mechanism, which comprises two folders which fold the flaps of the veneer-blank up to the upper and lower faces of the bar D and two vertically-operating folders that fold the ends of the blank over (the one overlapping the other) and against the back of the bar D.

F is a rock-shaft mounted in suitable bearings on the bed of the machine, as seen in Figs. 1, 3, 4, 5, and 6. On this shaft F is loosely mounted an arm $b^2$, Fig. 3, which is vibrated through the medium of an eccentric G on the main shaft C and a connecting-rod $G'$. To the upper end of the vibrating arm $b^2$ are hinged two folding arms $b$ and $b'$, connected by a spring $b^3$ and provided, respectively, with laterally-projecting folding jaws $b^x$ and $b'^x$. The former-bar B stands between the arms $b$ and $b'$, and these latter in their movements play over fixed guides $b^7$, up to which the arms are held elastically by the spring $b^3$. These guides $b^7$ keep the folding jaws properly distanced. It will be seen (see Figs. 1 and 2) that the arms $b$ and $b'$ stand to one side of the blank trough or holder E, and that the folding jaws thereon extend laterally over the said trough. When the blank has been raised by the pusher $E'$, it stands between these folding jaws and the front face of bar D. The eccentric G now draws back the jaws $b^x b'^x$, and they catch and fold the flaps of the blank against the upper and lower faces of the bar D, as represented in Fig. $3^a$. The upper arm $b$ is a little shorter than the lower one, and the folding jaw $b^x$ consequently strikes the blank first. The object of this is to allow the upper jaw to move on out of the way of the folder that next acts from above to fold the flap of the blank down against the rear face of the bar D. This second folding mechanism will now be described.

Referring to Fig. 6, the rock-shaft F is oscillated by means of a crank-cam $b^4$ on the main shaft C through a link $b^5$ and an arm $b^6$ on said rock-shaft. Secured to the rock-shaft F are two arms $d^3$ and $d^4$, in the ends of which is mounted a shaft $d^2$. Pivoted on this shaft $d^2$ are two arms $d$ and $d'$, which are provided, respectively, with laterally-projecting folding jaws $d^x$ and $d'^x$. These jaws have a "four-motion" movement. The first folds the upper flap of the blank downward, moving up, forward, down, and back again, and the latter folds the lower flap upward, following after the first in its movements and moving down, forward, up, and back. The arm $d$ is held up to an eccentric $d^5$ by a spring. The spring draws the arm toward the bar D and the eccentric pushes it back therefrom. The oscillations of shaft F impart the proper vertical movements. When the jaws $b^x b'^x$ have completed their work, and while they are still bearing on the blank, the jaw $d^x$ advances over and above the blank and then descends thereon, bending the upper flap of the blank down against the rear face of bar D. This position of the parts is represented in Fig. $3^b$. The jaw $d'^x$ moves up and down simultaneously with the jaw $b^x$; but its movements toward and from the bar D are controlled independently by mechanism that I will now describe with reference to Fig. 3. The arm $d'$ is held up to its cam by a spring $d^{5x}$, the same as arm $d$. It is this spring that is represented in Fig. 3; but both springs are alike and side by side. Fixed to the plate $E^x$ is a bracket $d^6$, provided with a cam-like marginal flange $d^7$, and pivoted to this bracket at its lower end is an arm $d^8$, provided with a laterally-arranged cam $d^9$, which is held up to the flange $d^7$ on the bracket by a suitable spring $d^{10}$. On the side of the arm $d'$ is a flattened pin $d^{11}$, which plays about the cam $d^9$ as the arm $d'$ moves up and down. When the arms $d$ and $d'$ are drawn down, the jaw $d^x$ moves forward and effects the folding of the upper flap of the blank; but the pin $d^{11}$ on the arm $d'$ moves down over the rear face of cam $d^9$, which pushes back the arm. When the pin $d^{11}$ passes below cam $d^9$, the spring $d^{5x}$ throws arm $d'$ forward and the jaw $d'^x$ assumes the position seen in Fig. 3$^b$. On the upstroke the pin $d^{11}$ takes behind the cam $d^9$, the spring $d^{10}$ yielding to allow the pin to pass upward between said cam and the flange $d^7$ of bracket $d^6$. The jaw $d^\times$ remains in contact with the upper flap long enough for the jaw $d'^\times$ to fold the lower flap over it far enough to catch and hold said upper flap. Fig. 3$^c$ shows the positions of the jaws when the folding has been effected.

After the blank has been folded about the bar D, the partly-formed tube is moved or slipped along said bar toward the left in Figs. 1 and 2 to the next operating-point. This shifting of the partly-formed tube is effected by means of a slide-rod H, arranged in bearings under and parallel with bar D and actuated by a barrel-cam H' with a groove, in which a roller or stud $f$ on said bar H engages, as seen in the principal figures. The bar H carries at its free end a shifter $f'$, which projects up through and plays in a slot in the bar D, the end of said shifter projecting through the bar far enough to engage the end of the partly-formed tube above as well as below, by preference. The cam H' is constructed to actuate the bar H quickly, and after the partly-formed tube has been shifted the bar is quickly retracted, so as to withdraw the shifter $f'$ out of the way of the folding devices.

In order to hold the partly-formed tube in its tubular form on the bar D and keep it from unfolding while it is being shifted, I employ a device seen best in Fig. 4. An arm $g'$ is hung on the shaft $d^2$ in a manner similar to the folding arms, except that it is slotted where the shaft $d^2$ passes through it. It is held up to an eccentric $g^3$ on the shaft C by a suitable spring $g^2$. The upper end of this arm $g'$ stands drawn back while the folding is being effected; but at the moment the folding jaw $d'^\times$ withdraws the upper end of the arm $g'$ moves forward, actuated by eccentric $g^3$ up to the flap of the partly-formed tube, and presses gently thereon in a manner to prevent it from unfolding. In order that the upward movement of shaft $d^2$ may not raise the end of the arm $g'$ above the level of the partly-formed tube on the bar D, which would interfere with succeeding operations to be described, the bearing of said arm on said shaft is slotted, and to prevent the friction of the parts from raising said arm I prefer also to provide the same with a projection $g^4$ to engage or take under some part of the machine. In the present case it takes under a shaft I.

I will now describe the mechanism for gumming or pasting the labels on the partly-formed tubes, referring especially to Figs. 2, 4, 7, and 8 for illustration.

The paste-applying or gumming device consists of a horizontally-arranged cylinder $h$, extending crosswise of the machine and in which revolves a screw $h^2$. On the outer end of the screw-shaft is secured a ratchet-wheel $h^3$, which is rotated intermittently by a pawl $h^4$, pivoted to a radial vibrating arm $h^5$. This arm is coupled by a rod $h^6$ to a slotted arm $h^8$, fixed on a rock-shaft $h^7$, mounted in a long bearing in a pillow-block $h^{11}$. On the other end of shaft $h^7$ is fixed an arm $h^9$, which carries a stud or roller that bears on the face of a barrel-cam $h^{10}$ on the main shaft C. A suitable spring (not shown) holds the stud on the arm up to the cam. The paste or gum is fed into the cylinder $h$ through a hopper $h'$, and as it is forced onto the delivery end of the cylinder it exudes through slits or perforations in a level plate $k$ on the top of cylinder $h$ at the delivery end thereof. These slits are seen in Fig. 2.

The label magazine or holder L is arranged directly over the slotted or perforated plate $k$. It is in the nature of a rectangular casing, (see Fig. 8,) mounted on and secured to an upright slide-bar $k'$. The labels Y are placed in the holder L in a pile, resting only on slight inwardly-projecting lips $k^5$, two of which are formed on the lower ends of upright metal strips $k^3$, which are arranged at the opposite ends, respectively, of the holder L, and are connected together by a tie piece or plate $k^4$ of a U form. The tie-piece $k^4$ is attached to the holder L and supports the strips $k^3$. Two of the supporting-lips $k^5$ are formed on the lower free end of a broad leaf-spring $k^2$, which is arranged at the front of the holder L, and is secured thereto at its upper end. The supporting-lips extend under the pile of labels to so slight an extent that the latter may be conveniently pushed down past them. The spring $k^2$ may be set or adjusted inward by means of a set-screw $k^{2\times}$. (See Figs. 4, 7, and 8.) The slide-bar $k'$ plays in suitable guides or keepers on the machine-frame and has on it a stud or roller $k^6$, which rests on a lifting-cam $k^7$, fixed on a rock-shaft M, mounted in suitable bearings on the frame. This shaft is rocked through the medium of an eccentric N on the main shaft C, an eccentric-rod N', and a crank-arm N$^2$ on said shaft M. The cam $k^7$ is so shaped as to impart an up-and-down reciprocating motion to the holder L, and at its lowest point the lower label of the pile is brought into contact with the paste on the plate $k$, whereby when the holder L rises this label will pull out and be left adhering to the said plate. In order to press down the pile of labels in the holder when the latter is at its lowest point, a weight L' rests on the pile of labels in the holder. This weight is lifted at the proper time by a device comprising a stem-rack $l$ on the weight, Fig. 7, and a spring-pawl $l^4$, which engages the teeth on said rack, said pawl being mounted on a guide-arm $l'$, which embraces said stem-rack. This arm is fixed on the upper end of an upright slide-rod $l^2$, which plays in suitable guides or keepers on the frame, and which has a stud or roller $l^\times$, that rests on a cam $l^3$, fixed on the shaft M. The cam $l^3$ is so constructed or shaped with respect to the cam $k^7$ (see Fig. 4) that the weight L' starts up a little ahead of the holder L, and so that, when the two descend and the bottom label reaches and rests on the plate $k$, the whole pressure of the weight L' will be thrown on the pile of labels and thus press the lower one firmly down onto said plate. The rack and pawl enable the weight L' to be lowered occasionally as the pile of labels becomes reduced in height by the removal of labels one by one at the bottom, as will be hereinafter described. By setting the end of the rod $h^6$ (see Fig. 1) out or in on the slotted arm $h^8$ the feed of the paste or gum may be regulated, as will be readily understood.

The gummed label left adhering to the plate $k$ is applied to the partly-formed tube by mechanism that I will now describe with especial reference to Fig. 4.

On a rock-shaft I is secured an arm $m$, provided with a roller $m^x$, which bears on a cam $m^7$ on the shaft C, being held up to said cam by a weight $m^{10}$, (or a spring,) attached to a branch of said arm $m$. The cam $m^7$ and said weight impart irregular vibratory movements to said arm $m$. At its upper end said arm carries a double pair of nippers consisting of a pair of fixed jaws $m'$ and a pair of movable jaws $m^2$, pivoted to the former at $m^3$. The nippers are held closed by springs $m^4$, and are opened by a lever pivoted on the arm $m$. One arm $m^5$ of this lever is acted upon by two projections $m^8$, carried by cam $m^7$, and the other end $m^6$ bears a pin $m^9$, which bears on the tails of the jaws $m^2$ and opens the nippers when the cams act on the end $m^5$ of the lever.

When the partly-formed tube has been shifted over in front of the plate $k$, the pairs of nippers, which stand in front of the bar D, move back over said bar, their two sets of open jaws entering or registering respectively with notches $n\ n$ in the front edge of plate $k$. The open jaws now embrace parts of the label that extend over said notches $n$, and they close on the label at these points. The nippers now withdraw, drawing the label edgewise off the plate $k$ in a manner to lay the paste or gum evenly over its surface, and after they have drawn it over the partly-formed tube on the bar D the nipper-jaws open and release it. The object in employing double nippers is to get a grip on the label at each corner, so that it may be drawn off evenly.

After the label is released by the nippers it is applied to the veneer-tube all around by mechanism I will now describe.

The device that smoothes down the label on the upper surface of the veneer-tube comprises a vibrating arm $n^4$, pivoted below at $n^5$ and having a roller or stud $n^4$, which bears on a cam $n^6$ on the shaft C. A spring $n'^x$ holds the roller up to the cam, and the spring and cam vibrate said arm $n^4$. In the upper end of this arm is fulcrumed a lever $n^3$, provided at one end with a lateral arm $n^2$, having a rubber $n'$, Figs. 1 and 4, on its face adapted to bear on and rub down the label. This rubber is raised and given the proper four-motion movement by means of a cam $n^9$ on the shaft C, which cam acts on one end of a cam-lever $n^8$, fulcrumed on the arm $n^4$. The other end of said cam-lever is coupled by a link $n^7$ to the end of the lever $n^3$. Simultaneous with the smoothing down of the label on the top of the veneer-tube the label is applied to the vertical face of said tube that stands adjacent to the pasting apparatus. This is effected by a device comprising an arm $p$, coupled at its lower end to the shaft $d^2$, which imparts to the arm a vertical reciprocating motion. This arm $p$ is held up to a cam $p''$ on shaft C by a spring, and it bears on its upper end a rubber $p^x$ of any suitable form and material, which rubs down the label when the arm is drawn down. The rubber $p^x$ acts on the label in a downward direction while the rubber $n'$ is drawing back, and thus the strain on the label in smoothing it will be in opposite directions simultaneously.

While the operations just detailed have been going on a new veneer-blank will have been folded, and in shifting along the bar D this last partly-formed tube pushes the first along also to the point where the label thereon is destined to have its remaining two flaps smoothed down. This latter "sticker" or device I will now describe with especial reference to Figs. 5 and 6.

The device that applies the label to the under side of the blank on the bar D is best seen in Fig. 5. This comprises a vibrating arm $p^2$, extending upon and from the rock-shaft F. On the upper end of this arm is pivoted a lever $p'$, on the operating end of which is a laterally-projecting rubber $p'^x$, with a convex face, which passes under the partly-formed tube and lays the flap of the label smoothly on its under side and then draws back. To enable the rubber to press elastically upward against the label, the other end of lever $p'$ is drawn down by a suitable spring $p^{2x}$, and to cause the rubber to draw down a little before it withdraws I mount an elbow-lever $p^3$ loosely on shaft F, and provide the upper arm of said lever with a laterally-projecting stud $p^5$, which takes over the lever $p'$. The other lower arm of the elbow-lever takes under a cam or eccentric $p^4$ on the shaft C. This eccentric imparts very little movement to the rubber. Only enough to enable it to clear the label in moving back is all that will be needed. The partly-formed tube is now again shifted along by the succeeding partly-formed tube to the device that applies or pastes down the end flaps of the label on the front side of the partly-formed tube, one end of the label overlapping the other. This device is illustrated best in Fig. 6, and it consists of an arm $q$, coupled at its lower end to the end of the arm $b^6$, through which the rock-shaft F is actuated. This arm $q$ bears against a cam $b^4$, which forms the crank which rocks shaft F. A spring $q^3$ holds the arm up to the cam. On its upper free end the arm $q$ bears a brush $q'$, wherewith the two flaps of the label are pasted down in succession. The vibrating arm $b^6$ and the cam $b^4$ together impart to the brush $q'$ a motion in a path similar to the numeral 8. Thus the brush in its descent rubs down the upper flap, draws away so as not to strike the lower flap in its further descent, then moves in under the lower flap, and in the upstroke smoothes it down. This operation completes the tube, and the latter is pushed off the free end of the bar D by the next succeeding partly-formed tube.

In Figs. 1 and 2 the trough E (which may be of any length) is broken away for lack of room. The eccentric or cam which actuates the lever $E^2$ is not shown in Fig. 1 for lack of room. It will be placed on the main shaft C, to the right of cam H'. The placing of this cam will be within the skill of any good mechanic.

A modified and in some respects a simpler device for pasting or sticking the labels on the blank is illustrated in Figs. 9 and 10. In this construction the arm $p^2$ (seen in Fig. 5) is extended above the lever $p'$, and pivoted to its upper end is an arm $p^7$, similar to the arm of lever $p'$. Shaft F is rocked by a cam $q^7$ on shaft C through the medium of an arm $q^3$, upon which said cam bears, link $p^5$ being omitted in this modification. The arm $p^2$ imparts the horizontal movement to lever $p'$ and arm $p^7$ simultaneously. The slight vertical movement is imparted to the rubbers on the free ends of said lever and arm by the following described mechanisms. A cam $q^5$ on shaft C acts on the upright arm of an elbow-lever $q^4$ on a rock-shaft $q^9$, and the other arm of said elbow-lever is coupled to the arm of lever $p'$ by a link $q^6$. Another cam $p^9$ on shaft C acts on an arm $p^8$, pivoted to arm $p^2$, and this arm $p^8$ is coupled to arm $p^7$ by a link $p^{11}$. A spring $p^{12}$ serves to keep the arm $p^8$ down upon its cam. The lever $p'$ and cam $p^7$ operate in a manner very similar to the arms $b$ and $b'$ that fold the veneer-blank over the bar D. The laterally-projecting rubber $p'^\times$ on the lever $p'$ presses the label to the tube on the under side of the bar D, and the rubber $p^{7\times}$ on the arm $p^7$ presses it to the veneer on the upper side of the bar. These rubbers act simultaneously, but not upon the same tube—that is, they act upon adjacent tubes on the bar D. The label having been drawn from the plate by the nippers and onto the tube on the bar D, (see Fig. 4,) said label is pressed down upon the top of said tube by the laterally-projecting rubber $p^{7\times}$. At the same time the arm presses the label up to the tube on the vertical face thereof presented to the pasting-plate $k$. When the tube is moved along in front of the rubber $p'^\times$, this rubber presses the label up to the under side of the same. The ends of the label are pasted down on the outer vertical face of the tube by the brush seen in Fig. 6. In order that the pawl $l^4$, (see Fig. 7,) which, by engagement with the teeth on the stem-rack $l$, raises the weight L' off the labels in the holder L, may be disengaged automatically, and thus allow the weight L' to adapt itself to the gradually-decreasing pile of labels, the device illustrated in Figs. 11 and 12 may be employed. Fig. 11 shows a part of the machine from the side opposite to that seen in Fig. 1, and Fig. 12 is a plan of this part. On the rock-shaft $h^7$ is fixed an arm $h^{12}$, the free beveled end of which is in such a position that when the label-holder L has descended and the bottom of the pile of labels therein rests upon the plate $k$ the rocking of shaft $h^7$ will cause the said free end of arm $h^{12}$ to descend upon and depress the arm of the pawl $l^4$, and thus free its opposite end from the ratchet-teeth in stem $l$. This will allow the weight L to press with its full weight upon the labels for a moment; but the arm $h^{12}$ will at once lift and free the pawl, so that it may again engage the teeth in the stem-rack. As the labels are gradually removed from below, the weight will descend lower and lower and the pawl will engage teeth farther and farther up the rack, owing to its automatic disengagement therefrom at each descent of the weight. However, this disengagement might be effected by other means than those described.

Having thus described my invention, I claim—

1. In a machine for making tubes for boxes, the combination, with the fixed bar D, constituting the former, of the holder for the veneer-blanks, the reciprocating pusher E', the horizontally-reciprocating folders $b^\times$ and $b'^\times$, and the vertically-reciprocating folders $d^\times$ and $d'^\times$, all arranged to operate as set forth.

2. The combination, with the cylinder $h$, its screw $h^2$, and the apertured plate $k$, through which the paste is forced from the cylinder, of the reciprocating label-holder L, arranged over said plate $k$, substantially as set forth.

3. The combination, with the bar D and the paste-cylinder provided with the perforated plate $k$, of the automatically-operating nippers that seize the label and draw it off said plate.

4. The combination, with the bar D and the distancing-guides $b^7$, of the shaft F, the arm $b^2$, loosely mounted on said shaft, the eccentric G, the eccentric-rod G', coupled to said arm $b^2$, the arms $b$ and $b'$, pivotally attached to the upper end of arm $b^2$ and embracing said guides $b^7$ and provided, respectively, with the jaws $b^\times$ and $b'^\times$, and the spring connecting the arms $b$ and $b'$, all arranged to operate substantially as set forth.

5. The combination, with the bar D and the plate $E^\times$, of the rocking shaft F, the arms $d^3$ and $d^4$ secured thereon, the shaft $d^2$, mounted in the ends of said arms, the arm $d$, loosely mounted on shaft $d^2$ and provided with a jaw $d^\times$, the eccentric and spring which impart vibration to said arm $d$, the arm $d'$, loosely mounted on the shaft $d^2$ and provided with a jaw $d'^\times$ and with a laterally-projecting stud $d^{11}$, the bracket $d^6$, provided with a cam-like flange $d^7$, the arm $d^8$, provided with a cam $d^9$, the spring $d^{10}$, which holds said cam $d^9$ up to the flange on the bracket, and the spring $d^{5\times}$, which holds the arm up to the cam, all arranged to operate substantially as set forth.

6. The combination, with the rocking shaft F and the bar D, of the arm $p^2$ fixed thereon, the lever $p'$, fulcrumed on the upper end of said arm and provided with a rubber $p'^\times$, the the spring $p^{2\times}$, attached to said lever, the elbow-lever $p^3$, loosely mounted on shaft F and provided on one arm with a stud or pin $p^5$ that takes over and rests on the lever $p'$, the eccentric $p^4$ on the main cam-shaft, which eccentric bears on the other arm of the elbow-lever, and said main cam-shaft, all arranged to operate substantially as set forth.

7. The combination, with the bar D and the vibrating arm $b^6$, of the arm $q$, loosely coupled at its lower end to arm $b^6$, the brush $q'$, secured to the upper end of said arm, the main cam-shaft, the cam $b^4$ fixed thereon, and the spring which holds the arm $q$ up to said cam, all arranged to operate substantially as set forth.

8. The combination, with the bar D and the paste-applying plate $k$, of the shaft I, the arm $m$, its weight $m^{10}$, its stud $m^\times$, the cam $m^7$, against which the arm $m$ bears, and the automatic nippers pivotally mounted on said arm $m$, substantially as set forth.

9. The combination of the bar D of the main cam-shaft, the cams $n^6$ and $n^9$ thereon, the arm $n^4$, pivoted at its lower end and provided with a stud or roller $n^4$ that bears on cam $n^6$, the spring $n'^\times$, that holds the roller $n^\times$ up to said cam, the lever $n^3$, pivoted in the upper end of arm $n^4$ and provided with a roller $n'$, the lever $n^8$, fulcrumed on arm $n^4$ and bearing at one end on cam $n^9$, and the link $n^7$, coupling the levers $n^3$ and $n^8$, substantially as set forth.

10. The combination, with the vibrating shaft $d^2$ and the bar D, of the vibrating arm $p$, hinged at its lower end to the shaft $d^2$ and provided at its upper end with a laterally-projecting rubber $p^\times$, which is arranged at the back of said bar D.

11. The combination, with the paste-applying plate $k$, of the label-holder L, the slide-bar $k'$, to which said holder is secured, provided with a stud or roller $k^6$, the rocking shaft M, and the cam $k^7$ thereon, arranged under the stud $k^6$, as set forth.

12. The combination, with the label-holder L, the slide-bar to which said holder is secured, the shaft M, and the cam $k^7$, which lifts said bar, of the weight L', provided with a rack-stem $l$, the slide-rod $l^2$, provided with a stud or roller $l^\times$, the cam $l^3$ on shaft M, on which the stud $l^\times$ rests, the arm $l'$ on the upper end of rod $l^2$, said arm embracing the stem of the weight, and the pawl $l^4$, mounted on said arm $l'$ and engaging the teeth on said stem, all arranged to operate substantially as set forth.

13. The combination of the shaft C, the cam $h^{10}$ thereon, the lever $h^8$, provided with a stud bearing on said cam, the rod $h^6$, coupled at one end to said lever $h^8$ and at the other end to the pawl-arm $h^5$, the said pawl-arm and its pawl $h^4$, the screw $h^2$ in the paste-cylinder $h$, the said cylinder, the ratchet-wheel $h^3$ on the projecting journal of the screw and engaged by said pawl, and the apertured paste-applying plate $k$, arranged at the discharging end of the paste-cylinder, all arranged to operate as set forth.

14. The combination, with the slotted bar D, the main cam-shaft C, and the cam H' on said shaft, of the slide-rod H, provided with a stud and roller $f$, engaging the groove in said cam, and the shifter $f'$, arranged in the slot in bar D, all arranged to operate substantially as set forth.

In witness whereof I have hereunto signed my name in the presence of two subscribing witnesses.

FRANS LUNDGREN.

Witnesses:
　NERE A. ELFWING,
　GERHARD AREHN.